United States Patent
Shaffer et al.

(10) Patent No.: US 8,655,266 B2
(45) Date of Patent: Feb. 18, 2014

(54) SYSTEM AND METHOD FOR USING MOBILE MEDIA PLAYERS IN A PEER-TO-PEER NETWORK

(75) Inventors: Shmuel Shaffer, Palo Alto, TX (US);
Ramanathan T. Jagadeesan, San Jose, CA (US); Bich T. Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 744 days.

(21) Appl. No.: 11/958,131

(22) Filed: Dec. 17, 2007

(65) Prior Publication Data
US 2009/0158382 A1  Jun. 18, 2009

(51) Int. Cl.
*H04H 40/00* (2008.01)
(52) U.S. Cl.
USPC ............................................ 455/3.06; 455/66.1

(58) Field of Classification Search
USPC ............ 455/3.06, 557, 414.1, 414.3; 709/231
See application file for complete search history.

(56) References Cited

U.S. PATENT DOCUMENTS

| | | | |
|---|---|---|---|
| 6,941,324 B2 | 9/2005 | Plastina et al. | 707/104.1 |
| 7,043,477 B2 | 5/2006 | Mercer et al. | 707/7 |
| 7,096,234 B2 | 8/2006 | Plastina et al. | 707/104.1 |
| 7,159,000 B2 | 1/2007 | Plastina et al. | 707/104.1 |
| 7,196,258 B2 | 3/2007 | Platt | 84/600 |
| 7,243,140 B2 | 7/2007 | Gupta et al. | 709/219 |
| 2006/0020662 A1* | 1/2006 | Robinson | 709/203 |
| 2008/0125172 A1* | 5/2008 | Leon et al. | 455/557 |

* cited by examiner

*Primary Examiner* — Tu X Nguyen
(74) *Attorney, Agent, or Firm* — Baker Botts L.L.P.

(57) ABSTRACT

In one embodiment, a system comprises a first mobile media player and a second mobile media player. The first mobile media player stores first media files, and the second mobile media player stores second media files. The first mobile media player and second mobile media player communicate with one another in a peer-to-peer network to generate a playlist and to play media files from the playlist.

21 Claims, 5 Drawing Sheets

| | 80 | 82 | 84 | 86 | 88 | 90 | 92 |
|---|---|---|---|---|---|---|---|
| | IDENTIFIER | ARTIST | TITLE | RATING | USAGE | GENRE | TYPE |
| 94 | 1 | NEIL DIAMOND | SWEET CAROLINE | 5 | 8 | FOLK | MUSIC |
| 96 | 2 | | CITY SLICKERS | 3 | 4 | COMEDY | MOVIE |
| | ⋮ | ⋮ | ⋮ | ⋮ | ⋮ | ⋮ | ⋮ |
| 98 | N | BILLY JOEL | PIANO MAN | 4 | 6 | POP | MUSIC |

SYSTEM AND METHOD FOR USING MOBILE MEDIA PLAYERS IN A PEER-TO-PEER NETWORK

TECHNICAL FIELD

The present disclosure relates generally to the field of communications.

BACKGROUND

A media player is hardware and/or software used to play video, audio, or other media. Many media players support an array of media formats, including audio and video files. Some media players focus only on audio or video and are known as audio players and video players, respectively. For example, audio music players play music in the form of MP3, WAV, AAC, or other file formats, and video players play movies, television shows, or other videos stored in MPEG, AVI, RealVideo, QuickTime, or other file formats. Some media players play both audio and video.

DESCRIPTION OF EXAMPLE EMBODIMENTS

Overview

In one embodiment, a mobile media player comprises a memory, a network interface, and a processing module. The memory stores a plurality of media files. The network interface communicates with other mobile media players in a peer-to-peer network. The processing module receives selection information relating to at least one other mobile media player and uses the selection information to generate a playlist identifying one or more media files.

In another embodiment, a system comprises a first mobile media player and a second mobile media player. The first mobile media player stores first media files, and the second mobile media player stores second media files. The first mobile media player and second mobile media player communicate with one another in a peer-to-peer network to generate a playlist and to play media files from the playlist.

Description

Figure 1:
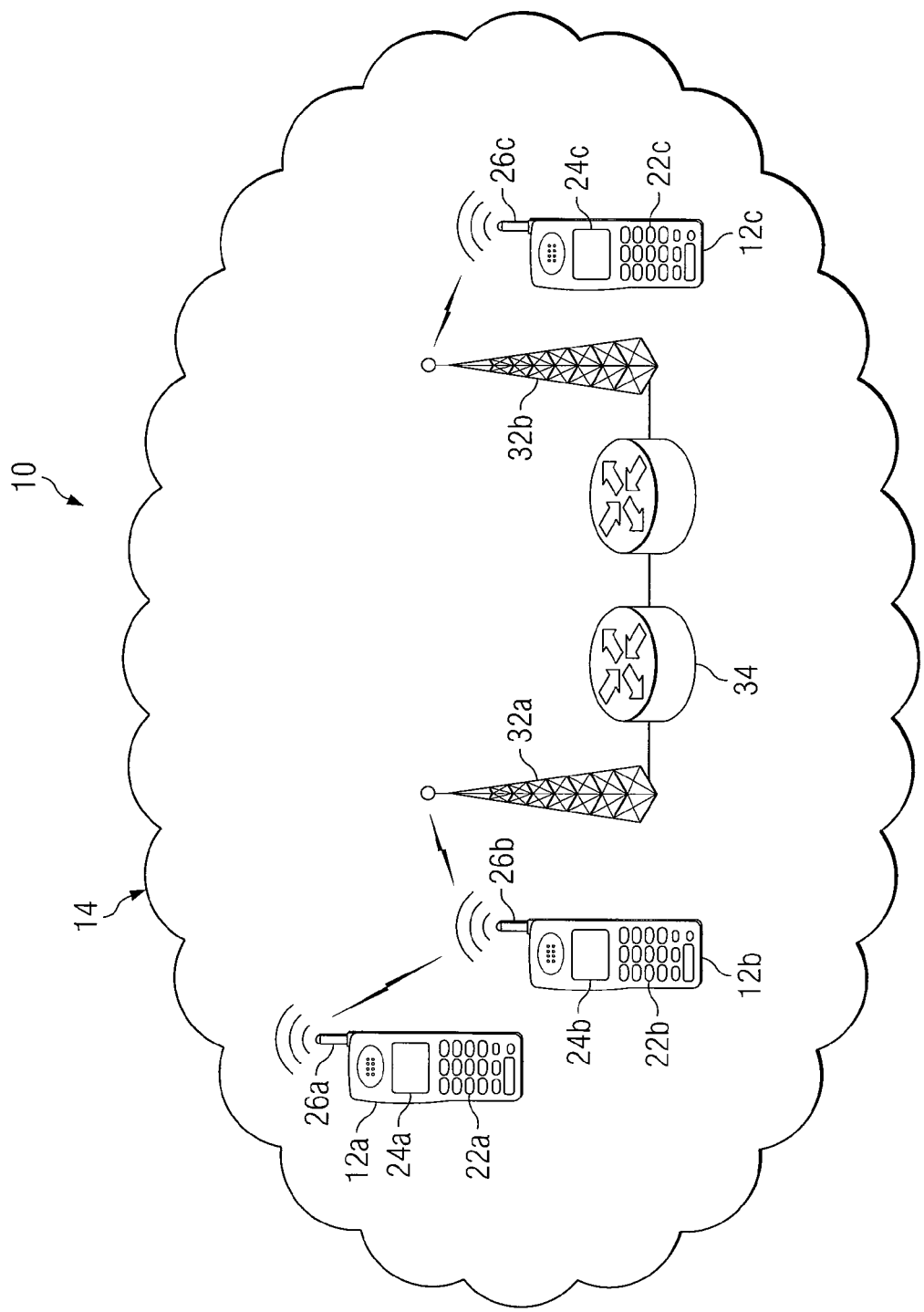
FIG. 1 illustrates an example of a system for using mobile media players in a peer-to-peer network.

FIG. 1 illustrates an example of a system 10 for using mobile media players 12a, 12b, and 12c (generally, mobile media players 12) in a peer-to-peer network 14. Within peer-to-peer network 14, mobile media players 12 may communicate with one another to generate a playlist of media files.

Mobile media players 12 may be any combination of hardware and software used to play audio, video, or other media files. In a particular embodiment, mobile media player 12a is an audio music player capably of playing MP3, WAV, AAC, or other audio file formats. In a particular embodiment, mobile media player 12b is a video player capable of playing MPEG, AVI, RealVideo, QuickTime, or other video file formats. In a particular embodiment, mobile media player 12c is a media player capably of playing both audio and video files.

Media players 12 are mobile in that a user may carry them from one location to another. For example, in a particular embodiment, media player 12a may be a MP3 or other audio player, such as an Apple iPod. In an alternative embodiment, media player 12b may be a laptop or notebook computer. In another particular embodiment, media player 12c may be a mobile telephone. Those skilled in the art will recognize that media players 12 may combine the functionality of playing voice, video, or any other media with mobile phone capabilities.

Mobile media players 12 include input interfaces 22a, 22b, and 22c (generally, input interfaces 22), output interfaces 24a, 24b, and 24c (generally, output interfaces 24), and network interfaces 26a, 26b, and 26c (generally, network interfaces 26). Input interfaces 22 may include a number pad, alpha-numeric keyboard, rolling ball, touch-screen, scroll wheel, or any other combination of hardware and/or software for receiving input information from a user. In one example embodiment, input interface 22 may be a microphone which may be associated with speech recognition functionality. Output interfaces 24 may include an LCD, speakers, monitor, screen, or any other combination of hardware and/or software for communicating output information to a user. Network interfaces 26 may include a network card, antenna, Bluetooth, or any other combination of hardware and/or software for communicating information to or from other mobile players 12 or other network devices.

Mobile media players 12 may communicate with one another using WiFi, Bluetooth, or other wireless or wireline technologies. In a particular embodiment, mobile media devices 12 may communicate directly to one another without an intervening network device. For example, as illustrated in FIG. 1, mobile media players 12a and 12b communicate directly with one another using wireless technology. In an alternative embodiment, mobile media players 12 may communicate to one another using one or more external bridges, routers, switches, or other network devices. For example, in the illustrated embodiment, mobile media players 12b and 12c communicate with one another using base stations 32a and 32b (generally, base stations 32) and router 34.

Mobile media players 12 communicate selection information to one another and use the selection information to generate a playlist. Mobile media player 12a may receive selection information from one or more other mobile media players 12, and mobile media player 12a generates the playlist using the selection information. Alternatively, mobile media players 12 may exchange selection information and jointly generate the playlist. For example, in a particular embodiment, mobile media player 12a may generate a playlist including a number of media files and communicate the playlist to mobile media player 12b, and mobile media player 12b may add a number of media files to the playlist and communicate the playlist back to media player 12a. In an alternative embodiment, two or more media players 12 may create separate playlists and then combine the separate playlist into a joint playlist. For example, mobile media players 12a, 12b, and 12c may create separate playlists, mobile media players 12b and 12c may communicate their playlists to mobile media player 12a, and mobile media player 12a may combine its playlist with the two playlists from mobile media players 12b and 12c. In a particular embodiment, mobile media player 12a may randomly select songs from the various playlists to include in a combined playlist. In an alternative embodiment, mobile media player may successively select songs from each of the various playlists to include in the combined playlist.

Mobile media player 12a may receive selection information indicating one or more media files stored on one or more other media players 12b and 12c and then generate a playlist from common media files stored in mobile media player 12a and mobile media players 12b and 12c. In particular embodiment, mobile media player 12a requests selection information from mobile media player 12b, and in response, mobile media player 12b communicates to mobile media player 12a a list identifying at least some of the media files stored in mobile media player 12b. In such an embodiment, mobile media player 12a uses the list to identify common media files stored in both mobile media player 12a and mobile media player 12b. Mobile media player 12a may then generate a playlist from the identified common media files. In an alternative embodiment, mobile media player 12a may generate a playlist from a combination of media files stored in mobile media player 12a and media files stored in mobile media player 12b, including media files that are not common to both mobile media players 12a and 12b.

Mobile media player 12a may receive selection information indicating a genre of media and then generate a playlist from media files associated with the genre. A genre may be any suitable category, type, or description used to classify media into groups. For example, in particular embodiment, genres associated with audio music files may include rock, jazz, world, rap, pop, country, classical, or any other suitable category of music. In a particular embodiment, media player 12a receives from one or more other media players 12b and 12c selection information indicating one or more genres that the users of media players 12b and 12c like, and media player 12a selects one or more common genres liked by the users of media players 12. Each media player 12 may determine which genres a user likes based either on user input or on the genres associated with the media files stored in media player 12. In an alternative embodiment, media player 12a receives from one or more other media players 12b and 12c selection information indicating one or more genres that the user of media players 12b and 12c dislike, and media player 12a selects one more genres, excluding the genres disliked by the users of media players 12b and 12c. Media player 12a may identify media files associated with the selected genres and generate a playlist from the identified media files associated with the selected genres.

Mobile media player 12a may receive selection information including rating information and generate a playlist from media files according to the rating information. In a particular embodiment, the usage information indicates how much a user likes or dislikes various media files stored on media player 12. In such an embodiment, the usage information may be a rating on a fixed scale, such as, for example, a number scale from 1 to 5 with a 1 indicating that user dislikes a file and a 5 indicating that the user likes the file. In a particular embodiment, media player 12b communicates to media player 12a rating information identifying a number of media files that are highly rated, and media player 12a generates a playlist from the media files identified by the rating information. Media player 12a may select media files for the playlist from the rating information based on information stored in media player 12a. For example, media player 12a may select media files from the rating information that are stored in media player 12a, that are also highly rated in media player 12a, or that have been frequently played by media player 12a.

Mobile media player 12a may receive selection information including usage information and generate a playlist from media files according to the usage information. In a particular embodiment, the usage information indicates how frequently mobile media player 12 has played media files stored on media player 12. For example, in an audio player, the usage information may indicate the number of times a user has played each of several audio files. In a particular embodiment, media player 12b communicates to media player 12a usage information identifying a number of media files that media player 12b has played the most number of times, and media player 12a generates a playlist from the media files identified by the usage information. Media player 12a may select media files for the playlist from the usage information based on information stored in media player 12a. For example, media player 12a may select media files from the usage information that are stored in media player 12a, that are highly rated in media player 12a, or that have also been frequently played by media player 12a.

After generating the playlist, media player 12a may communicate the playlist to other media players 12b and/or 12c. In a particular embodiment, media player 12a communicates identifiers identifying each of the media files included in the playlist. In an alternative embodiment, media player 12a communicates the media files included in the playlist.

Media players 12 may play the media files included in the playlist. In a particular embodiment, each media player 12 may separately play the media files. In an alternative embodiment, two or more media players 12 may communicate with one another to synchronize playback of the media files. For example, in such an embodiment, one mobile media player 12a may be designated the master, and one or more other mobile media players 12b or 12c may be a slave. In such an arrangement, master media player 12a receives user input indicating when to perform start, stop, skip, or other functions relating to the playing of the media files on the playlist, and media player 12a communicates to other mobile media players 12b and 12c instructions to carryout the functions input by the user of media player 12a. Alternatively, rather than a master-slave arrangement, each media players 12 may be able to receive user input indicating when to perform start, stop, skip, or other functions, and each media player 12 may communicate to other mobile media players 12 instructions to carryout the functions input by the user.

Mobile media players 12 may communicate synchronization information to one another to confirm that their playback is synchronized. For example, in a particular embodiment, media player 12 may communicate synchronization information indicating the point in the media files of a playlist that media player 12 is playing a particular point in time. Using the synchronization information, mobile media players 12 may adjust their playing of the media files such that media players 12 are playing substantially the same portion of the media files of a playlist at substantially the same time. In a particular embodiment, mobile media players 12 may communicate the synchronization information when they begin to play a media file. In an alternative embodiment, mobile media players 12 communicate synchronization information to one another at period intervals, such as at fixed intervals of time.

Figures 2, 3:
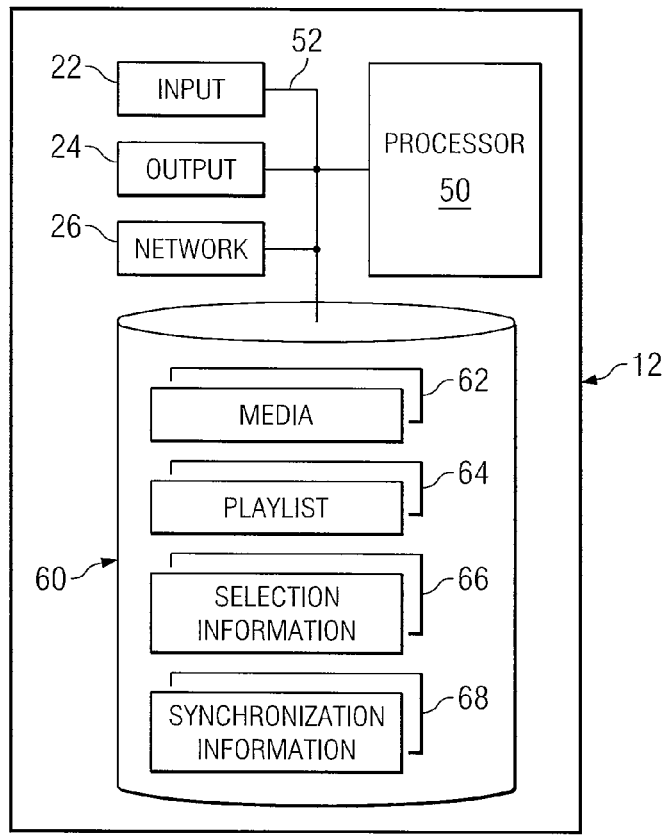
FIG. 2 illustrates an example mobile media player for use in a peer-to-peer network.
FIG. 3 illustrates an example of table of media file information.

FIG. 2 illustrates an example mobile media player 12 for use in peer-to-peer network 14. As described above, mobile media player 12 communicates with other media players 12 to generate playlists 64 and to play media files 62 from playlists 64. Media player 12 includes input interface 22, output interface 24, network interface 26, processor 50 and memory 60.

Memory 60 stores information used by processor 50 to generate playlists 64. Memory 60 stores media files 62, playlists 64, selection information 66, and synchronization information 68. Memory 60 may include any combination of volatile and non-volatile memory. In a particular embodiment, memory 60 may include flash memory. In an alternative embodiment, memory 60 includes a hard drive.

Media files 62 may include audio files, video files, photos, images, or any other suitable combination of audio and/or visual information. In a particular embodiment, media files 62 include MP3, WAV, AAC, or other audio files. In an alternative embodiment, media files 62 include MPEG, AVI, RealVideo, QuickTime, or other video files. Media files 62 may include or be associated with descriptive or identifying text relating to the audio, video, or other content of media files 62.

Playlist 64 represents a group of one or more media files 62 associated together as a group. In a particular embodiment, playlist 64 may be a list or other data structure including identifiers associated with one or more media files 62. Playlist 64 may include or be associated with descriptive or identifying text relating to playlist 64 and/or media files 62 included in playlist 64.

Selection information 66 is information used to generate playlists 64. Selection information may relate to media files 62 stored in memory 60 or may relate to media files 62 stored in other mobile media devices 12. As explained above, mobile media player 12 may receive selection information 66 from one or more other media players 12 and may communicate selection information 66 to one or more other media players 12. In a particular embodiment, selection information 66 identifies one or more media files 62 stored on one or more other media players 12. In an alternative embodiment, selection information 66 may identify one or more genres that a user of medial player 12 either like or dislikes. In another embodiment, selection information 66 may include rating information indicating how much a user of media player 12 likes or dislikes various media files 62. In another embodiment, selection information 66 may include usage information indicating how frequently or how many times mobile media player has played media files 62. Selection information 66 may include any combination of media file identification information, genre information, rating information, usage information, or any other suitable information that may be used to generate playlist 64.

Synchronization information 68 is information used by mobile media players 12 to synchronize their playing of media files 62. In a particular embodiment, synchronization information 68 is used to indicate to other mobile media players 12 the point in media files 62 of playlist 64 that processor 50 is playing a particular point in time. For example, synchronization information 68 may identify a particular part of media file 62, such one minute from the beginning of media file 62, and media player 12 communicates synchronization information 68 to other media players 12 when processor 50 is playing that portion of media file 62. In an alternative embodiment, synchronization information 68 may identify periodic intervals in media files 62 or playlists 64, such as every two minutes, every 30 second, or any other suitable interval of time. In a particular embodiment, synchronization information 68 is stored together with and associated with media files 62 or playlists 64.

Input interface 22 receives input information from a user. In a particular embodiment, input interface 22 may include a number pad, alpha-numeric keyboard, rolling ball, touch-screen, scroll wheel, or any other combination of hardware and/or software for receiving input information from a user. Input interface 22 may receive input information used to generate selection information 66 relating to media files 62. For example, input information may include ratings relating media files 62, and processor 50 may store the ratings as selection information 66 in memory 60 for later use in generating playlist 64 from media files 62. Alternatively, input information interface 22 may receive input information relating to the functions of mobile media player 12. For example, input information interface 22 may receive user input indicating when to perform start, stop, skip, or other functions relating to the playing of media files 62 or playlists 64.

Output interface 24 communicates output information to a user. In a particular embodiment, output interface 24 may include an LCD, speakers, monitor, screen, or any other combination of hardware and/or software for communicating output information to a user. For example, output interface 24 may include an LCD, monitor, screen, or other visual interface for communicating textual information about playlist 64, media file 62, functions of media player 12, communications with other media players 12, and/or status of media player 12. In addition, output interface 24 may include speakers, headphone jack, headphones, or other audio, video, or visual interfaces for communicating audio, video, or other media information from media files 62.

Network interface 26 supports communications with one or more other mobile media players 12. In a particular embodiment, network interface 26 may include a network card, antenna, Bluetooth, or any other combination of hardware and/or software for communicating information to or from other mobile players 12, base stations 32, or other network devices 34. Network interface 26 may communicate with another media player 12 using WiFi, Bluetooth, or other wireless or wireline technologies. In a particular embodiment, network interface 26 may communicate directly to another media player 12 without an intervening network device. In an alternative embodiment, network interface 26 may communicate with another media player 12 using one or more base stations 32, external bridges, routers, switches, or other network devices 34.

Processor 50 generates playlists 64 of media files 62 and plays media files 62 from playlists 64. In a particular embodiment, processor 50 may include any suitable combination of hardware and/or software. Processor 50 may receive input information from a user using input interface 22 and communicate output information to a user using output interface 24. Processor 50 may communicate media files 62, playlists 64, selection information 66, synchronization information 68, or other suitable information with other mobile media players 12 using network interface 26. Processor may store media files 62, playlists 64, selection information 66, synchronization information 68, or other suitable information in memory 60. Processor 50 may communicate with input interface 22, output interface 24, network interface 26, and memory 60 using any suitable combination of shared and/or dedicated communication paths. In a particular embodiment, processor 50 communicates with input interface 22, output interface 24, network interface 26, and memory 60 using a bus 52.

FIG. 3 illustrates an example of table 78 of media file information. Table 78 may include selection information 66. Mobile media player 12 may use table 78 or any other suitable data structure to store information about medial files 62 in memory 60. Mobile media player 12 may use the media file information in table 78 to generate playlist 64.

Column 80 of table 78 includes a identifier for each media file 62 stored in memory 60. In the particular illustrated embodiment, the identifiers in column 80 are numbers. In alternative embodiment, the identifier may be a data address, a pointer, an alpha-numeric label, or any other designation suitable for identifying media files 62.

Column 82 of table 78 lists the artist associated with each media file 62. Some media files 62, like the songs in rows 94 and 98, may be associated with a single artist. Other media files 62, such as the movie in row 96, may be associated with no artist. Other media files 62 may be associated with several artists.

Column 84 lists the title of each media file 62. The title may be a string of characters that can be output to the user to identify each media file 62.

Column 86 includes rating information associated with each media file 62. In a particular embodiment, the rating information may be a number indicating how much a user likes or dislikes each media file 62. In an alternative embodiment, the rating information in column 86 may be a description of the user's assessment of each media 62. In another alternative embodiment, the rating may be a symbol or collection of symbols, such as a number of stars.

In a particular embodiment, mobile media player 12 may use the rating information in column 86 as selection information 66 to be used to generate playlist 64. For example, media player 12 may use the rating information to select highly rated media files 62. In such an embodiment, media player 12 may use the rating information to generate playlist 64, or media player 12 may communicate the rating information to another media player 12 to use to generate playlist 64. Alternatively, media player 12 may use the rating information to select media files 62 and then communicate selection information 66 identifying the selected media files 62 to another mobile media player 12.

Column 88 includes usage information associated with each media file 62. In a particular embodiment, column 88 may indicate the number of times a user has started playing or finished playing each media file 62. In an alternative embodiment, the usage information in column 88 may indicate the amount of time the user has spent playing each media file 62. In another alternative embodiment, the rating may be any designation suitable for comparing or contrasting the amount of time media player 12 has played each media file 62 relative to other media files 62 in memory 60.

In a particular embodiment, mobile media player 12 may use the usage information in column 88 as selection information 66 to be used to generate playlist 64. For example, media player 12 may use the usage information to select media files 62 played more often than other media files 62. In such an embodiment, media player 12 may use the usage information to generate playlist 64, or media player 12 may communicate the usage information to another media player 12 to use to generate playlist 64. Alternatively, media player 12 may use the usage information to select media files 62 and then communicate selection information 66 identifying the selected media files 62 to another mobile media player 12.

Column 90 includes a genre associated with each media file 62. In a particular embodiment, each media file 62 may be associated with a single genre. In an alternative embodiment, each media file 62 may be associated with more than one genre.

In a particular embodiment, mobile media player 12 may use the genre information in column 90 as selection information 66 to be used to generate playlist 64. For example, media player 12 may receive user input selecting a particular genre and use the genre information to select media files 62 associated with the particular genre. In such an embodiment, media player 12 may use the genre information to generate playlist 64, or media player 12 may communicate the genre information to another media player 12 to use to generate playlist 64. Alternatively, media player 12 may use the genre information to select media files 62 and then communicate selection information 66 identifying the selected media files 62 to another mobile media player 12.

Column 92 associated each media file 62 with a type of file. For example, media file number 1 in row 94 is identified as a music file, and media file number 2 in row 96 is identified as a movie file.

Table 78 is an example illustrating that type of information that mobile media player 12 may store to be used to generate playlist 64. In alternative embodiments, media player 12 may use other types of selection information 66 to generate playlist 64.

Figure 4A:
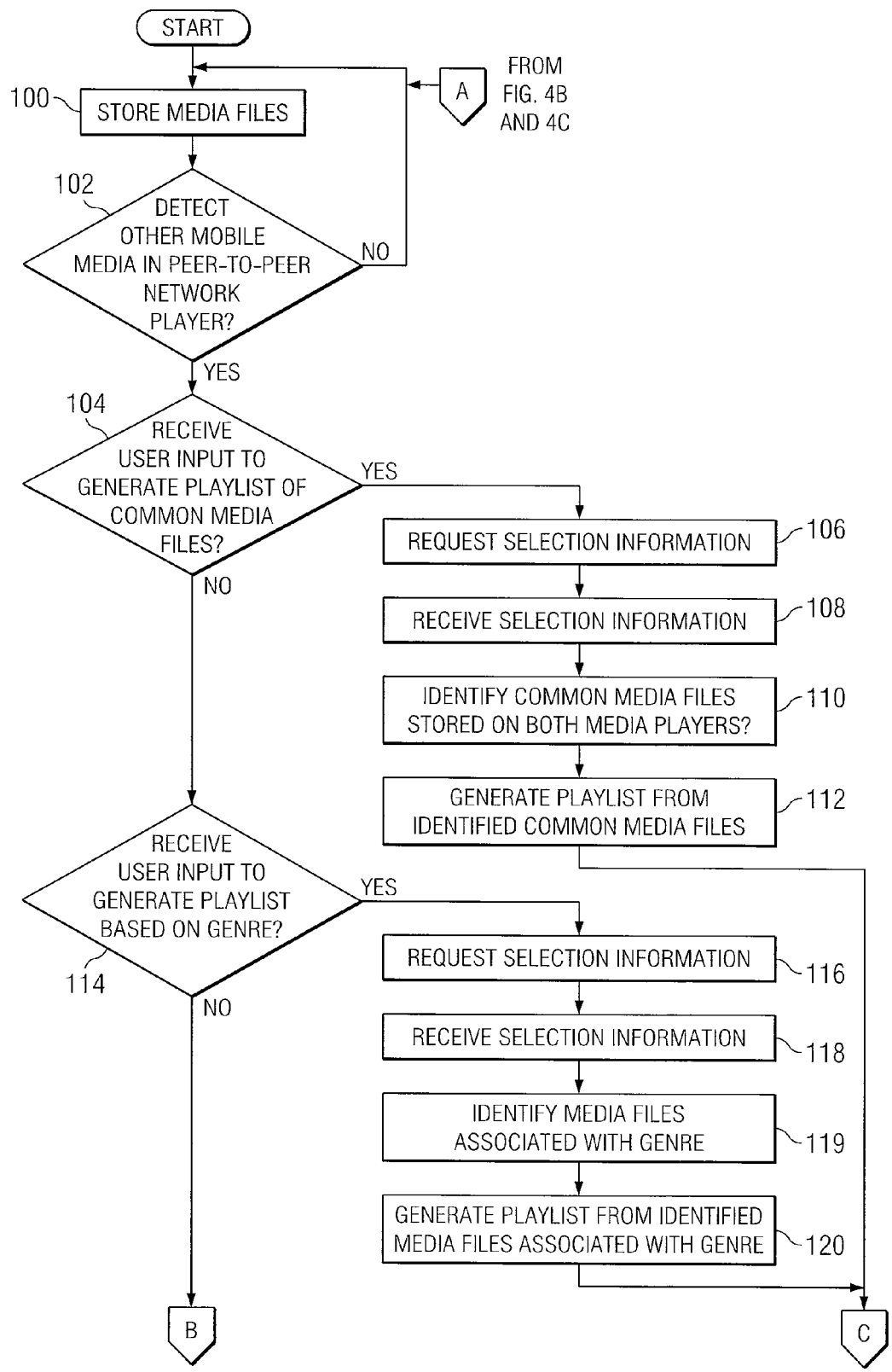
FIG. 4 illustrates an example method of generating and playing a playlist using a mobile media player in a peer-to-peer network.
Figure 4B:
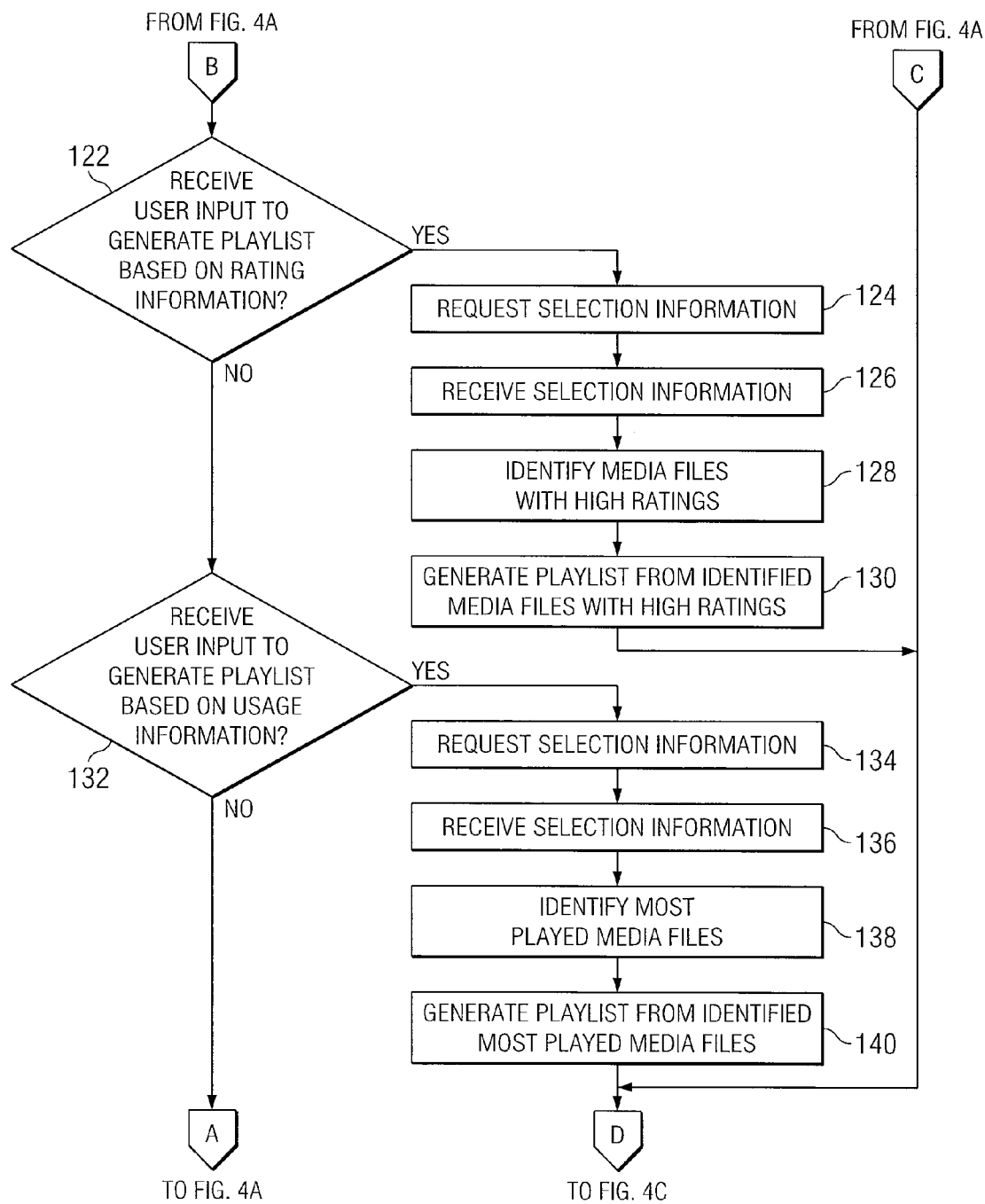
Figure 4C:
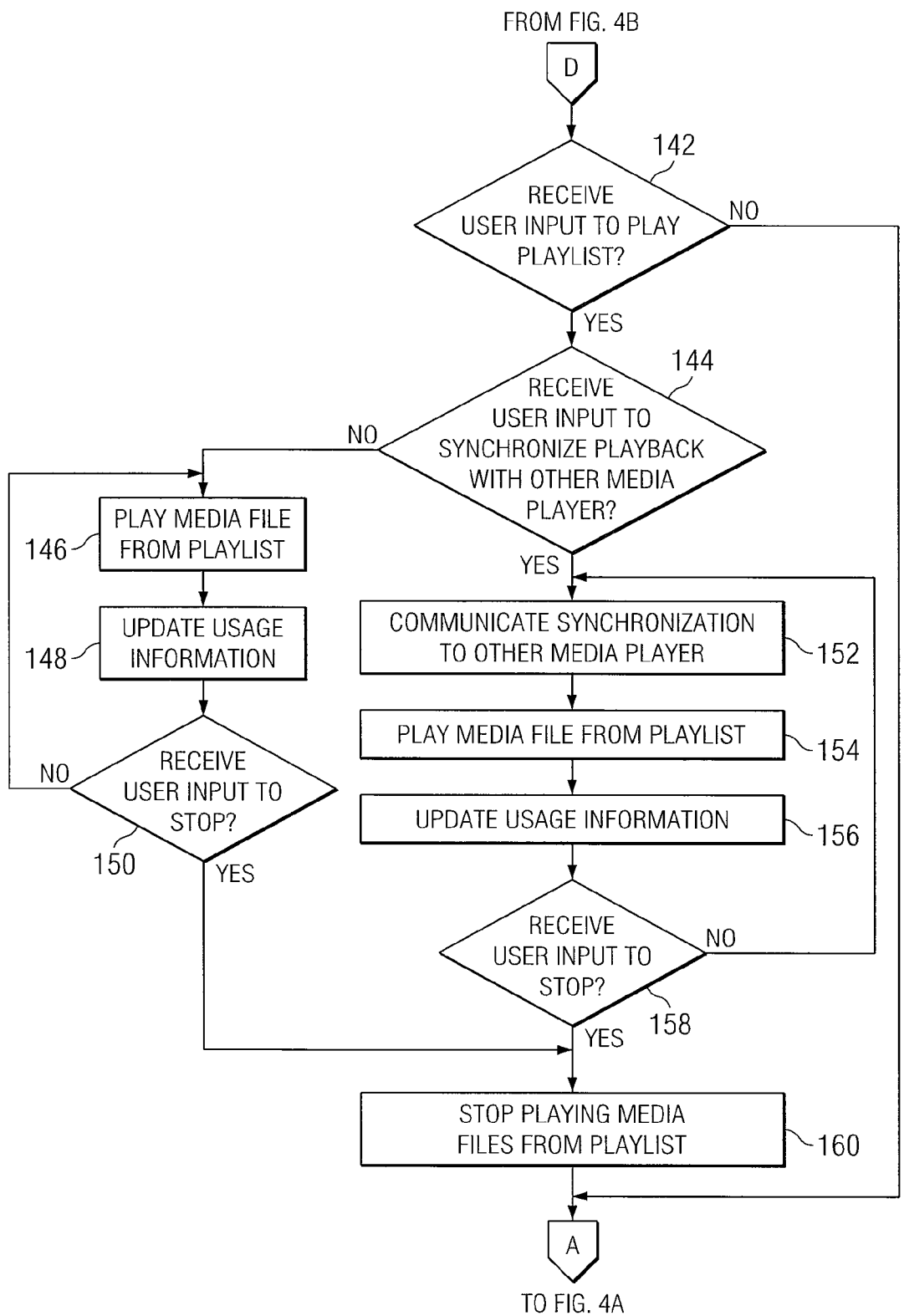

FIG. 4 illustrates an example method of generating a playlist and playing a playlist using a media player in peer-to-peer network 14. The method begins at step 100, where mobile media player 12 stores media files 62 in memory 60.

At step 102, mobile media player 12 may detect another mobile media player 12 in peer-to-peer network 14 using network interface 26. If mobile media player 12 does not detect another mobile media player 12 at step 102, mobile media player 12 continues to store media files 62 in memory 60 at step 100. If mobile media player 12 detects another mobile media player 12 at step 102, the method continues at steps 104, 114, 122, and 132, where mobile media player may receives one of several user requests to generate playlist 64.

If, at step 104, mobile media player 12 receives user input requesting mobile media player 12 to generate playlist 64 from media files 12 common to both media players 12, media player 12 requests selection information 66 from other media player 12 at step 106 and receives selection information 66 at step 108. In a particular embodiment, selection information 66 identifies media files 62 stored on another mobile media player 12. Using selection information 66, mobile media player 12 identifies common media files 62 stored on both mobile media players 12 at step 110 and generates playlist 64 from identified common media files 62 at step 112. The method continues at step 142.

If mobile media player 12 does not receive user input requesting mobile media player 12 to generate playlist 64 from media files 62 common to both media players 12 at step 104, mobile media player 12 may receive user input requesting mobile media player 12 to generate playlist 64 based on genre at step 114. If, at step 114, mobile media player 12 receives user input requesting mobile media player 12 to generate playlist 64 based on genre, media player 12 requests selection information 66 from other media player 12 at step 116 and receives selection information 66 at step 118. In a particular embodiment, media player 12 receives from one or more other media players 12 selection information indicating one or more genres that the users of media players 12 like. At step 119, mobile media player 12 identifies media files 62 associated with the genres indicated by selection information 66. At step 120, mobile media player 12 generates playlist 64 from identified media files 62 associated with the genres. The method continues at step 142.

If mobile media player 12 does not receive user input requesting mobile media player 12 to generate playlist 64 based on genre at step 114, mobile media player 12 may receive user input requesting mobile media player 12 to generate playlist 64 based on rating information at step 122. If, at step 122, mobile media player 12 receives user input requesting mobile media player 12 to generate playlist 64 based on rating information, mobile media player 12 requests selection information 66 from other media player 12 at step 124 and receives selection information 66 at step 126. In a particular embodiment, media player 12 receives rating information indicating one or more media files 62 the user of other media player 12 likes. Mobile media player 12 identifies media files 62 with high ratings at step 128 and generates playlist 64 from identified media files 62 with high ratings at step 130. The method continues at step 142.

If mobile media player 12 does not receive user input requesting mobile media player 12 to generate playlist 64 based on rating information at step 122, mobile media player 12 may receive user input requesting mobile media player 12 to generate playlist 64 based on usage information at step 132. If, at step 132, mobile media player 12 receives user input requesting mobile media player 12 to generate playlist 64 based on usage information, media player 12 requests selection information 66 from other media player 12 at step 134 and receives selection information 66 at step 136. In a particular embodiment, media player 12 receives from one or more other media players 12 usage information indicating one or more media files 62 the users of media players 12 play most often. Mobile media player 12 identifies media files 62 played most often using selection information 66 at step 138 and generates playlist 64 from identified most played media files 62 at step 140. The method continues at step 142.

At step 142, mobile media player 12 may receive user input requesting mobile media player 12 to play playlist 64. If mobile player 12 does not receive user input requesting media player 12 to play playlist 64, the method returns to step 100. If mobile media player 12 receives user input requesting mobile media player 12 to play playlist 64, the method continues at step 144, where mobile media player 12 may receive user input requesting mobile media play 12 to synchronize playback with other media player 12.

If mobile media player 12 does not receive user input requesting mobile media play 12 to synchronize playback with other media player 12, mobile media player 12 plays media files 62 from playlist 64 at step 146. Mobile media player 12 may update usage information at step 148. In a particular embodiment, the usage information may indicate the number of times a user has started playing or finished playing each media file 62, and mobile media player 12 updates the usage information each time if starts playing or finishes playing each media file 62. At step 150, mobile media player 12 may receive user input requesting mobile media player 12 to stop playing media files 62 from playlist 64. If mobile media player 12 does not receive user input to stop, the method continues at step 146, where mobile media player 12 continues playing media files 62 from playlist 64. If mobile media player 12 receives user input to stop, mobile media player stops playing media files 62 from playlist 64 at step 160, and the method continues at step 100.

If mobile media player 12 receives user input requesting mobile media play 12 to synchronize playback with other media player 12 at step 144, mobile media player 12 communicates synchronization information 68 to other media player 12 at step 152. In particular embodiment, mobile media player 12 may communicate synchronization information 68 only to initiate the playing of media files 62. In alternative embodiment, mobile media player 12 may communicate synchronization information 68 when it starts playing each media file 62 from playlist 64. In yet another embodiment, mobile media player 12 may communicate synchronization information 68 during the playing of media files 62, for example at periodic intervals.

Mobile media player 12 plays media files 62 from playlist 64 at step 154. Mobile media player 12 may update usage information at step 156. In a particular embodiment, the usage information may indicate the number of times a user has started playing or finished playing each media file 62, and mobile media player 12 updates the usage information each time if starts playing or finishes playing each media file 62. At step 158, mobile media player 12 may receive user input requesting mobile media player 12 to stop playing media files 62 from playlist 64. If mobile media player 12 does not receive user input to stop, the method returns to step 152, where mobile media player 12 communicates synchronization information 68 to other media player 12. If mobile media player 12 receives user input to sop, mobile media player stops playing media files 62 from playlist 64 at step 160, and the method continues at step 100.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A mobile media player, comprising:
a memory operable to store a plurality of media files;
a processing module operable to:
store the plurality of media files in the memory;
detect the presence of another mobile media player after storing the plurality of media files in the memory;
send a request to the other mobile media player for selection information after detecting the presence of the other mobile media player;
receive selection information sent from the other mobile media player in response to sending the request to the other mobile media player for the selection information;
compare the received selection information to the plurality of media files stored in the memory after receiving the selection information sent from the other mobile media player;
generate a playlist identifying one or more of the plurality of media files stored in the memory in response to comparing the received selection information to the plurality of media files stored in the memory, the identified one or more of the plurality of media files being stored in the memory prior to detecting the presence of the other mobile media player;
send the generated playlist to the other mobile media player; and
receive a second playlist from the other mobile media player in response to sending the generated playlist to the other mobile media player, the second playlist indentifying a first media file not identified by the generated playlist.

2. The mobile media player of claim 1, wherein:
the selection information comprises a list of media files stored on the other mobile media player; and
the processing module generates the playlist by identifying common media files that are stored both in the memory and in the other media player and generating the playlist from the common media files.

3. The mobile media player of claim 1, wherein:
the selection information comprises a genre; and
the processing module generates the playlist by identifying media files associated with the genre and generating the playlist from the identified media files associated with the genre.

4. The mobile media player of claim 1, wherein:
the selection information comprises rating information relating to media files stored on the other mobile media player; and the processing module generates the playlist by selecting media files according to the rating information and generating the playlist from the selected media files.

5. The mobile media player of claim 1, wherein the processing module is further operable to communicate the playlist to the other mobile media player.

6. The mobile media player of claim 1, wherein the processing module is operable to synchronize with the other mobile media player playback of the media, files from the playlist.

7. One or more non-transitory computer-readable media comprising instructions that, when executed by at least one processor of a first mobile media player, are configured to:
store a plurality of media files in a memory of the first mobile media player;
detect the presence of a second mobile media player after storing the plurality of media files in the memory;
send a request to the second mobile media player for selection inforination after detecting the presence of the second mobile media player;
receive selection information sent from the second mobile media player in response to sending the request to the second mobile media player for the selection information;
compare the received selection information to a plurality of media files stored in a memory of the first mobile media player after receiving the selection information sent from the second mobile media player;
generate a playlist identifying one or more of the plurality of media files in response to comparing the received selection information to the plurality of media files stored in the memory, the identified one or more of the plurality of media files being stored in the memory prior to detecting the presence of the second mobile media player;
send the generated playlist to the second mobile media player; and
receive a second playlist from the second mobile media player in response to sending the generated playlist to the second mobile media player, the second playlist identifying a first media file not identified by the generated playlist.

8. The media of claim 7, wherein:
the selection information comprises a list identifying first media files stored on the second mobile media player; and
the instructions are further configured to generate the playlist from common media files that are both identified on the list and stored in the first mobile media player.

9. The media of claim 7, wherein:
the selection information comprises a genre of media; and
the instructions are further configured to generate the playlist from media files associated with the genre.

10. The media of claim 7, wherein:
the selection information comprises rating information relating to media files stored on the second mobile media player; and
the instructions are further configured to generate the playlist using the rating information.

11. The media of claim 7, wherein:
the selection information comprises usage information relating to media files stored on the second mobile media player; and
the instructions are further configured to generate the playlist using the usage information.

12. The media of claim 7, wherein the instructions are further configured to communicate the playlist to the second mobile media player.

13. The media of claim 7, wherein the instructions are further configured to synchronize playback of the media files from the playlist with the second mobile media player.

14. A method comprising:
storing, at a first mobile media player, a plurality of media files in a memory;
detecting, at the first mobile media player, the presence of a second mobile media player after storing the plurality of media files in the memory;
sending, at a first mobile media player, a request to the second mobile media player for selection information after detecting the presence of the second mobile media player;
receiving, at the first mobile media player, selection information relating to the second mobile media player in response to sending the request to the second mobile media player for the selection information;
comparing the received selection information to a plurality of media files stored in the first mobile media player after receiving the selection information sent from the second mobile media player;
generating a playlist identifying one or more of the plurality of media files stored on the first mobile media player in response to comparing the received selection information to the plurality of media files stored in the first mobile media player, the identified one or more of the plurality of media files being stored in the memory prior to detecting the presence of the second mobile media player;
sending the generated playlist to the second mobile media player; and
receiving a second playlist from the second mobile media player in response to sending the generated playlist to the second mobile media player, the second playlist identifying a first media file not identified by the generated playlist.

15. The method of claim 14, wherein:
the selection information comprises a list identifying a second plurality of media files stored on the second mobile media player; and
generating the playlist comprises generating the playlist from common media files that are stored on both the first mobile media player and the second mobile media player.

16. The method of claim 14, wherein:
the selection information comprises a genre; and
generating the playlist comprises generating the playlist from media files of the plurality of media files associated with the genre.

17. The method of claim 14, wherein:
the selection information comprises rating information; and
generating the playlist comprises generating the playlist based on the rating information.

18. The method of claim 14, wherein:
the selection information comprises usage information relating to media files stored on the second mobile media player; and
generating the playlist comprises generating the playlist based on the usage information.

19. The method of claim 14, wherein:
generating the playlist comprises generating the playlist at the first mobile media player and communicating the playlist from the first mobile media player to the second mobile media player.

20. The method of claim 14, further comprising synchronizing playback of the media files from the playlist on the first mobile media player and second mobile media player.

21. An apparatus, comprising:

means for storing, at a mobile media player, a plurality of media files in a memory;

means for detecting the presence of another mobile media player after storing the plurality of media files in the memory;

means for sending a request to the other mobile media player for selection information after detecting the presence of the other mobile media player;

means for receiving selection information sent from the other mobile media player in response to sending the request to the other mobile media player for the selection information;

means for comparing, after receiving the selection information sent from the other mobile media player, the received selection information to the plurality of media files stored in the memory;

means for generating a playlist identifying one or more of the plurality of media files stored in the memory in response to comparing the received selection information to the plurality of media files stored in the memory, the identified one or more of the plurality of media files being stored in the memory prior to detecting the presence of the other mobile media player;

means for sending the generated playlist to the other mobile media player; and means for receiving a second playlist from the other mobile media player in response to sending the generated playlist to the other mobile media player, the second playlist identifying a first media file not identified by the generated playlist.

* * * * *